(12) United States Patent
Hegmann

(10) Patent No.: US 11,182,495 B2
(45) Date of Patent: Nov. 23, 2021

(54) SECURE MANAGEMENT OF ACCESS DATA FOR CONTROL DEVICES

(71) Applicant: Siemens Aktiengesellschaft, Munich (DE)

(72) Inventor: Michael Hegmann, Schwabach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/973,725

(22) PCT Filed: May 15, 2019

(86) PCT No.: PCT/EP2019/062449
§ 371 (c)(1),
(2) Date: Dec. 9, 2020

(87) PCT Pub. No.: WO2019/238345
PCT Pub. Date: Dec. 19, 2019

(65) Prior Publication Data
US 2021/0248248 A1  Aug. 12, 2021

(30) Foreign Application Priority Data
Jun. 11, 2018 (EP) .................... 18176904

(51) Int. Cl.
*G06F 21/00* (2013.01)
*G06F 21/62* (2013.01)
(Continued)

(52) U.S. Cl.
CPC ............. *G06F 21/62* (2013.01); *G05B 15/02* (2013.01); *H04L 63/0428* (2013.01)

(58) Field of Classification Search
CPC ...... G06F 21/62; G05B 15/02; H04L 63/0428
See application file for complete search history.

(56) References Cited

U.S. PATENT DOCUMENTS 5,842,043 A * 11/1998 Nishimura ............ H04L 63/101
710/36
10,270,766 B2 * 4/2019 Pitt ........................ G06F 21/62
(Continued)

FOREIGN PATENT DOCUMENTS

CN  101803331 A  8/2010
CN  105378744 A  3/2016
(Continued)

OTHER PUBLICATIONS

PCT International Search Report and Written Opinion of International Searching Authority dated Jul. 29, 2019 corresponding to PCT International Application No. PCT/EP2019/062449 filed May 15, 2019.

*Primary Examiner* — Khai M Nguyen
(74) *Attorney, Agent, or Firm* — Henry M. Feiereisen LLC

(57) ABSTRACT

A control device of a machine or system data compares access data with a current access authorization. If there is a match, access to user data stored in the control device is permitted. The control device occasionally accepts encrypted verification data from an external computer via a network and stores them encrypted or unencrypted as current verification data, with the current access authorization being derived from the unencrypted current verification data. Verification data already stored in the control device as current verification data when the verification data are accepted are retained as old verification data, while older verification data are overwritten. The accepted access data are compared with an old access authorization derived from the old verification data. An operator can access the user data only if there is a match with the old access authorization.

6 Claims, 6 Drawing Sheets

(51) Int. Cl.
*G05B 15/02* (2006.01)
*H04L 29/06* (2006.01)

(56) References Cited

U.S. PATENT DOCUMENTS

| | | | |
|---|---|---|---|
| 10,936,711 B2* | 3/2021 | Jain | G06F 21/6218 |
| 2007/0079355 A1* | 4/2007 | Chand | G05B 19/054 |
| | | | 726/2 |
| 2008/0301445 A1* | 12/2008 | Vasic | G06F 21/6245 |
| | | | 713/171 |
| 2009/0164039 A1 | 6/2009 | Jung et al. | |
| 2009/0287837 A1* | 11/2009 | Felsher | G06Q 10/10 |
| | | | 709/229 |
| 2010/0186075 A1 | 7/2010 | Hohlbaum et al. | |
| 2014/0331060 A1 | 11/2014 | Hayton | |
| 2016/0212129 A1 | 7/2016 | Johnston et al. | |

FOREIGN PATENT DOCUMENTS

| | | |
|---|---|---|
| CN | 106330934 A | 1/2017 |
| CN | 106537403 A | 3/2017 |
| CN | 107431714 A | 12/2017 |
| DE | 10 2008 010 864 A1 | 8/2009 |
| EP | 1 403 749 A1 | 3/2004 |
| EP | 2807063 A2 | 8/2015 |

* cited by examiner

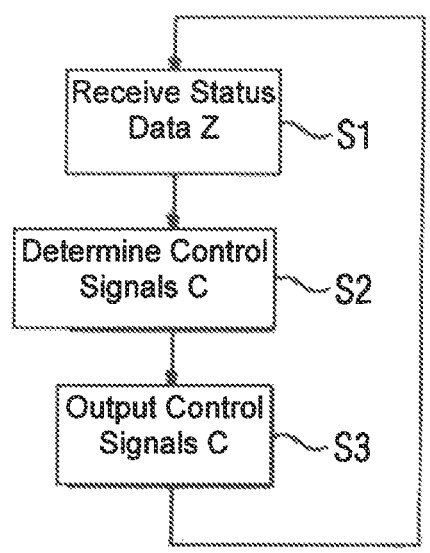
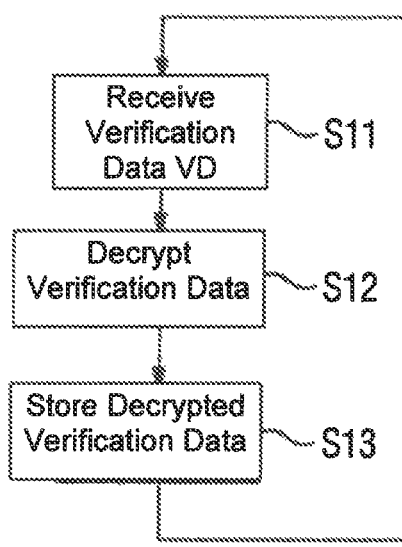

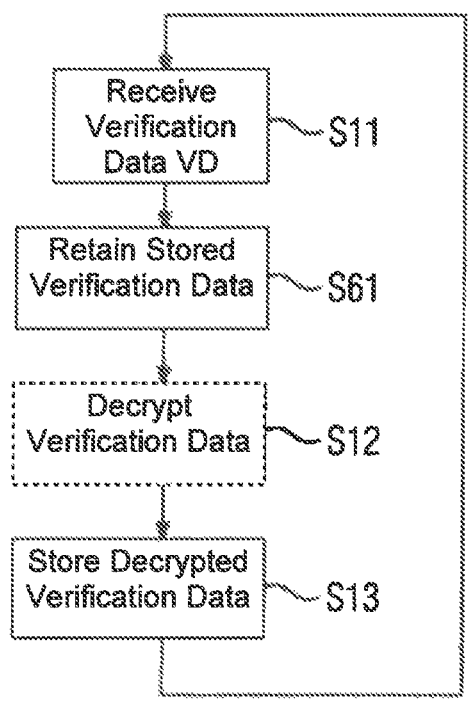

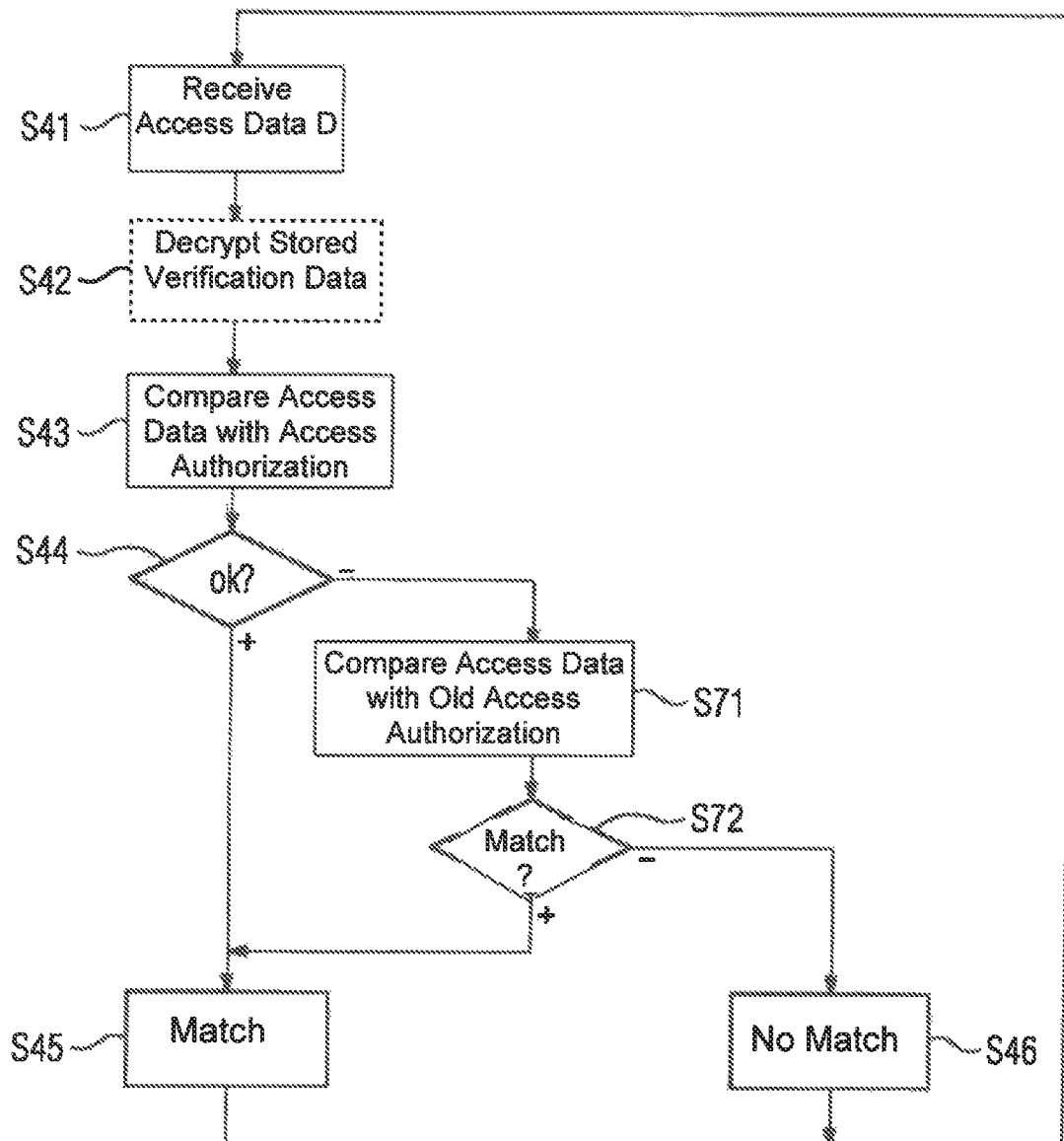

SECURE MANAGEMENT OF ACCESS DATA FOR CONTROL DEVICES

CROSS-REFERENCES TO RELATED APPLICATIONS

This application is the U.S. National Stage of International Application No. PCT/EP2019/062449, filed May 15, 2019, which designated the United States and has been published as International Publication No. WO 2019/238345 A1 and which claims the priority of European Patent Application, Serial No. 18176904.3, filed Jun. 11, 2018, pursuant to 35 U.S.C. 119(a)-(d).

BACKGROUND OF THE INVENTION

The present invention is based on an operating method for a control device of a machine or system,
  wherein the control device receives access data at any points in time,
  wherein the control device compares the received access data with a current access authorization,
  wherein the control device, if there is a match, allows access to user data stored within the control device,
  wherein the control device generates and/or considers the user data in the context of controlling the machine or system.

The present invention is further based on a computer program, which comprises machine code, which can be processed by a control device for a system or machine, wherein the processing of the machine code by the control device causes the control device to execute an operating method of the type cited in the introduction.

The present invention is further based on a control device for a system or machine,
  wherein the control device has a link to a computer network, by way of which the control device can be connected to a computer,
  wherein the control device is programmed with a computer program of the type cited in the introduction, so that it executes an operating method of the type cited in the introduction.

In many cases, control devices for machines and systems are operated by people. The respective person makes a specification which is considered by the control device in the context of executing its normal operating program, in other words controlling the machine or system. With some machines or systems, it can be completely noncritical whether the person making the specifications is authorized to do so. With other machines or systems, it must however be reliably ensured that specifications which are specified to the control device are only specified by people authorized to do so.

This can already relate to specifications with respect to normal operation, in other words, for instance, which control program is to be executed or at which points in time a control program is to be executed. To ensure that specifications of this type are only made by people authorized to do so, it is usual for the corresponding person firstly to have to log on to the controller, whereby he specifies a user name and a password or a similar authorization.

The authentication and authorization of "normal" users, i.e. users who make specifications with respect to normal operation, can be easily configured securely. By way of example, with the operator of the machine or system, an administrator (or a similar person) can transmit a list of user names and associated passwords centrally from a computer via a computer network to the control device and can update this list as required. In particular, this list can be changed by the administrator at any time, for instance if an employee of the operator of the system or machine leaves the company or periodically after a month or a similar period of time in each case. Conversely the user name and the password can also be transmitted from the control device to the computer and with normal authorization of the user the approval can be carried out by the computer.

There is, however, also user data within the control device, which is considered by the control device in the context of controlling the machine or system, in which it is undesirable, however, that it can be set, changed and in part also only viewed by "normal" users. User data of this type can relate, for instance, to the parameterization of the controller, for instance the setting of control loops, by means of which parts of the machine or system are controlled, or diagnostic data. The setting, changing, and viewing of such user data should, however, likewise be possible, but not by the "normal" user. Instead, it should be necessary here for a service employee of the manufacturer of the machine or system or a service employee of the manufacturer of the control device to log on to the controller with special access data.

Updating and changing and above all keeping such access data secret represents a significant problem. In particular, access data of this type is generally not communicated to the operator of the machine or system so that the latter neither knows it or is able to change or update it. In the prior art, access data of this type often remains unchanged during the entire service life of the machine or system or the control device; this may be a number of years.

From a security point of view, this represents a problem, in particular a weak point for hacker attacks. On the one hand, access authorizations, which do not change during a prolonged period, in principle already represent a problem. Above all, however, the service employees of the manufacturer of the machine or system or the control device know the special access data. If a service employee of this type leaves his employer, for instance, there is the risk of the confidentiality of the special access data being compromised. A further complication is that very significant changes to the setting of the control device are possible, in particular by way of the special access of the service employee, with correspondingly wide-ranging consequences during operation of the machine or system.

One possible solution consists in the special access of the service employee to the control device normally being deactivated and only briefly being activated by the administrator so that the service employee is able to log on to the control device, carry out his activities and then log off again. After logging off the special access of the service employee is deactivated again by the administrator. This solution however has a number of disadvantages. Firstly, a possibility must be created within the control device to ensure that the administrator logs on to the control device so that he is able to activate and deactivate the special access of the service employee. Furthermore, the administrator must personally be present, so that he can perform the activation and the deactivation. Furthermore, it is necessary for the administrator to log on to the control device not only via the computer network, but instead also directly on site. This is because otherwise the activation of the access for the service employee would in particular no longer be possible if problems occur on the control device which relate to the functionality of the link to the computer network.

A further approach consists in the special access of the service employee being deactivated or blocked permanently. In this case, it is impossible to perform special, profound diagnoses and settings. If necessary, longer downtimes of the controlled machine or system must be taken into account.

One further approach consists in connecting the control device temporarily or permanently to a computer of the manufacturer of the machine or system or the control device and in transmitting the access data of the service employee to this computer and checking it there or conversely in transmitting the access authorization from this computer to the control device. The problem with this procedure consists in the link to the computer network possibly being disturbed. In this case, the service employee is no longer able to log on to the control device.

One further approach consists in the control device outputting a primary code to the service employee on site in plain text, wherein the service employee derives a secondary code from the primary code by way of an algorithm; he must specify the secondary code to the control device. The weak point of this procedure consists in the algorithm possibly becoming known.

One further approach consists in the service employee only being permitted to log on to the control device with specific devices (for instance a specific laptop) which have a certificate which is classified as trustworthy. In this case, the control device must however be able to reliably identify such certificates. They must therefore be stored in the control device. It may also not be possible to manipulate or falsify such certificates. This is generally ensured. Care must be taken, however, to ensure that the certificate on the device, by means of which the service employee logs on to the control device, matches with one of the certificates on the control device. It must therefore be possible to store new certificates on the control device and to be able to delete older stored certificates again.

It is theoretically conceivable for the special user data also to be able to be changed by each normal user. As a result, special access for the service employee would be dispensable. Precisely one modifiability of the special user data by each normal user should however be avoided.

An operating method of the type cited in the introduction is known from US 2007/0 079 355 A1, for instance.

U.S. Pat. No. 5,842,043 A1 discloses a data processing system, which is used in the context of business transactions. With this system provision is made for access authorizations to be transmitted to other units of the computer network as required by a unit of a computer network referred to as the network manager.

The object of the present invention consists in creating possibilities, by means of which the problems of the prior art are resolved.

SUMMARY OF THE INVENTION

The object is achieved by an operating method as set forth hereinafter. Advantageous embodiments of the operating method form the subject matter of the dependent claims.

In accordance with the invention an operating method of the type cited in the introduction is configured such that the control device occasionally receives encrypted verification data from a computer via a link to a computer network and stores the received verification data in the control device in encrypted or in unencrypted form as current verification data, the control device derives the current access authorization from the unencrypted current verification data, the control device retains verification data which is already stored in the control device as current verification data when the verification data is received as old verification data, the data stored previously as old verification data is overwritten, the control device also compares the received access data with an old access authorization derived from the old verification data, the control device also then allows the operator to access the user data if the received access data matches the old access authorization, and the control device only then does not allow access to the user data stored within the control device when the received access data matches neither the current access authorization nor the old access authorization.

The verification data is therefore on the one hand occasionally and thus repeatedly updated. As a result, the problems which may occur as a result of outdated access data can be avoided. The encrypted verification data is however transmitted occasionally, not just if problems occur on the control device, the machine or the system and thus in particular the link to the computer network could also be disturbed. The last transmitted verification data is then valid or current until the next transmission of new verification data. By storing the "old" verification data, it is further possible that valid verification data is then also present in the control device if problems occur in the transmission of the encrypted verification data or when storing the verification data as current verification data. By overwriting the data stored previously as old verification data, it is not possible for a person who only knows "sufficiently old verification data" to obtain unauthorized access to the control device.

An asymmetric encryption method is preferably applied in order to encrypt and decrypt the verification data. The control device therefore preferably decrypts the received verification data before or after storing the verification data by means of a secret key, while the encryption takes place by means of a public key which differs from the secret key. For this purpose, the control device can provide the public key for retrieval via the computer network and/or an interface arranged on the control device.

The occasional transfer of the encrypted verification data can take place as required. For instance, it is possible for the encrypted verification data of the control device to be specified by the computer at periodic time intervals. In this case, the computer is therefore the active part, which of its own accord determines in each case the encrypted verification data to the control device. Alternatively, it is possible for the control device to be the active part, in other words the control device retrieves the encrypted verification data from the computer via the computer network. The retrieval can take place for instance on account of a time lapse which is monitored by the control device and/or on account of a specification of an update command by an operator. This operator can be the service employee or a "normal" operator.

The control device can be embodied for instance as a CNC (computer numeric control), as an MC (motion control) or as a PLC (programmable logic control). It is also possible for the control device to be embodied as a drive controller.

The object is further achieved in accordance with the invention by a computer program, wherein the computer program of the type cited in the introduction is configured so that the processing of the machine code by the control device causes the control device to execute an inventive operating method.

The object is further achieved in accordance with the invention by a control device for a system or machine, wherein the control device of the type cited in the introduction is programmed with an inventive computer program so that it executes an inventive operating method.

BRIEF DESCRIPTION OF THE DRAWING

The afore-described properties, features and advantages of this invention as well as the manner in which these are achieved will become clearer and more intelligible in connection with the following description of the exemplary embodiments, which are explained in more detail in conjunction with the drawings. In this regard, shown in a schematic representation:

FIGS. 2 to 9 show flow charts.

DETAILED DESCRIPTION OF PREFERRED EMBODIMENTS

Figure 1:
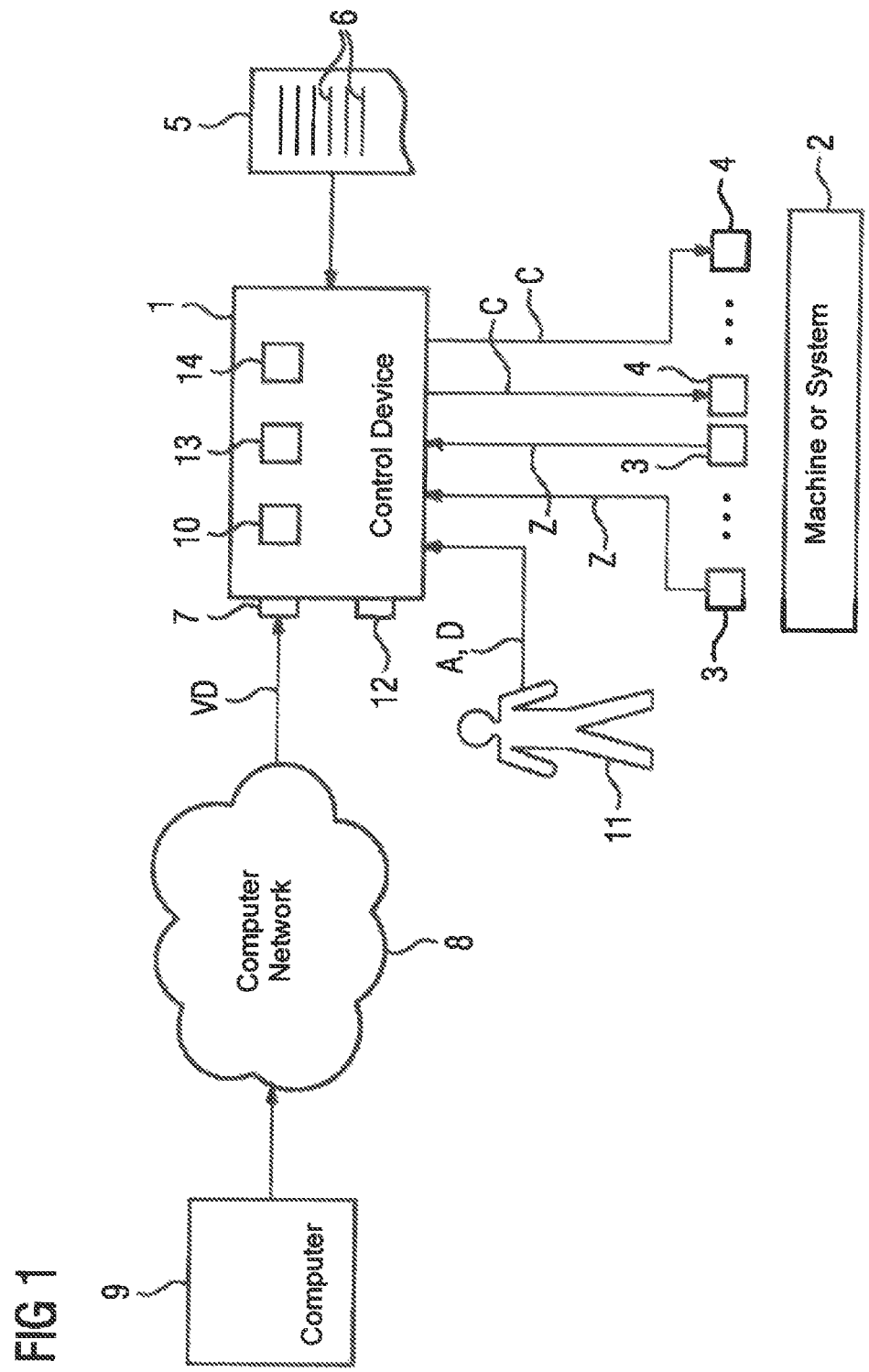
FIG. 1 shows a control device for a system or machine and further components.

According to FIG. 1, a system or machine 2 is to be controlled by means of a control device 1. The system or machine 2 can in principle be of any type. For instance, it can be a machine tool, a robot, a packaging machine, a chemical system or another machine or system. It can also be a drive. The control device 1 is embodied according to its application. For instance, with a machine tool, the control device 1 is embodied as a CNC (computer numeric control). With a robot the control device 1 can be embodied as a CNC or as an MC (motion control). With another system 2, for instance a packaging machine, the control device 1 can be embodied as an MC or as a PLC (programmable logic control). With a drive, it is the drive controller.

Irrespective of its specific embodiment as a CNC, MC, PLC, or other type of control device, according to the representation in FIG. 2, the control device 1 cyclically executes steps S1 to S3 during normal operation, in which it controls the machine or system 2.

In step S1, the control device 1 receives status data Z of the machine or system 2 via sensors 3, for instance position signals, speed signals, temperature signals or addressing end switches. In step S2, the control device 1 determines control signals C for actuators 4. In step S3, the control device 1 outputs the determined control signals C to the actuators 4, so that the state of the machine or system 2 is influenced by way of the actuation of the actuators 4.

The determination of step S2 is performed by the control device 1 by taking the status data Z into consideration. In addition, the control device 1 considers status data Z' stored within the control device 1 and user data ND stored within the control device 1, subsequently abbreviated to internal status data Z' and internal user data ND. The control device 1 therefore considers the internal status data Z' and the internal user data ND in the context of controlling the machine or system 2. Alternatively or in addition to considering the user data ND, it is also possible for the control device 1 to produce the internal user data ND.

The internal status data Z' can be the values of counters, markers or timers, for instance. During operation of the system or machine 2, in other words during normal operation of the control device 1, they can change. One possible reason for a change is a time lapse. That internal user data ND which is considered by the control device 1 when the control signals C are determined is however unchangeable, at least generally, during normal operation. By way of example, internal user data ND of this type can be parameterizations of controllers, by means of which the control signals C are determined. For instance, the user data ND can comprise the proportionality constant of a P controller or the proportionality constant and the reset time of a PI controller. That internal user data ND which is produced by the control device 1 can be diagnostic data, for instance.

The internal status data Z' can be stored in a non-volatile or volatile manner in the control device 1, as required. The internal user data ND is generally stored in a non-volatile manner in the control device 1. Non-volatile storage means that the corresponding data Z', ND also then remains if an energy supply of the control device 1 is disconnected. For instance, the corresponding data Z', ND can be stored on a hard disk, in an EEPROM, a battery-backed RAM or another storage device, the content of which is retained when the power supply of the control device 1 is disconnected.

The control device 1 is programmed with a computer program 5. The computer program 5 comprises machine code 6, which can be processed by the control device 1. The processing of the machine code 6 by the control device 1 means that during normal operation the control device 1 controls the machine or system 2 according to the procedure explained in conjunction with FIG. 2. If necessary, here the control device 1 can consider a supplementary parameterization. This is of less significance within the context of the present invention, however. Additionally, however, the control device 1 executes further measures, which are explained below in conjunction with the further FIGs. In this context, it is of significance that the control device 1 has a link 7 to a computer network 8, so that the control device 1 can be connected to a computer 9. The computer network 8 can be the internet or the world wide web, for instance. The computer 9 can be operated for instance by a manufacturer of the control device 1 or a manufacturer of the system or machine 2—both contrary to the operator of the system or machine 2.

Within the context of the further measures, in a step S11 the control device 1 according to FIG. 3 receives verification data VD from the computer 9 via the link 7 to the computer network 8. The verification data VD is encrypted cryptographically. In particular, the verification data VD can be encrypted according to an asymmetric cryptographic method, in other words according to a method in which a first key is used for encryption while a second key which differs from the first key is used for decryption. The first key is in most cases referred to as a public key, the second key as a private or secret key. A known asymmetric cryptographic method of this type is the RSA method named after its inventors Rivest, Shamir and Adleman. Other methods are also known, however.

In a step S12, the control device 1 decrypts the received verification data VD and determines thus decrypted verification data VD'. In a step S13, the control device 1 stores the decrypted verification data VD'. The decryption of step S12 generally relates only to the transmission-related encryption. The verification data VD' determined by means of step S12 is generally encrypted again internally. The verification data VD' is generally stored in the control device 1 in a non-volatile manner.

All the embodiments below relating to the verification data VD, VD' are based on the assumption that the control device 1 (partially) decrypts the received verification data VD in step S12 and as a result in step S13 stores the (partially) decrypted verification data VD'. It is however likewise possible for step S12 to be dispensed with and for the control device 1 in step S13 to store the (completely) encrypted verification data VD. For this reason, step S12 in FIG. 3 is only shown with dashed lines.

The control device 1 occasionally executes the steps S11 to S13. The time lag between two executions of steps S11 to S13 as such can be according to requirements. It will generally lie within the range of a number of days, possibly also in the range of weeks or months.

The manner in which it is ensured that the verification data VD is repeatedly transmitted to the control device 1 can be according to requirements.

For instance, the computer 9 can ensure that the computer 9 repeatedly independently initiates a transmission of new verification data VD. In this case, the encrypted verification data VD of the control device 1 is specified by the computer 9 at periodic time intervals. In this case, according to the representation in FIG. 4, the step S11 is divided into two steps S21 and S22. In step S21, the control device 1 checks whether the verification data VD is transmitted to it. If this is the case, the control device 1 receives the transmitted verification data VD in step S22.

Figure 5:
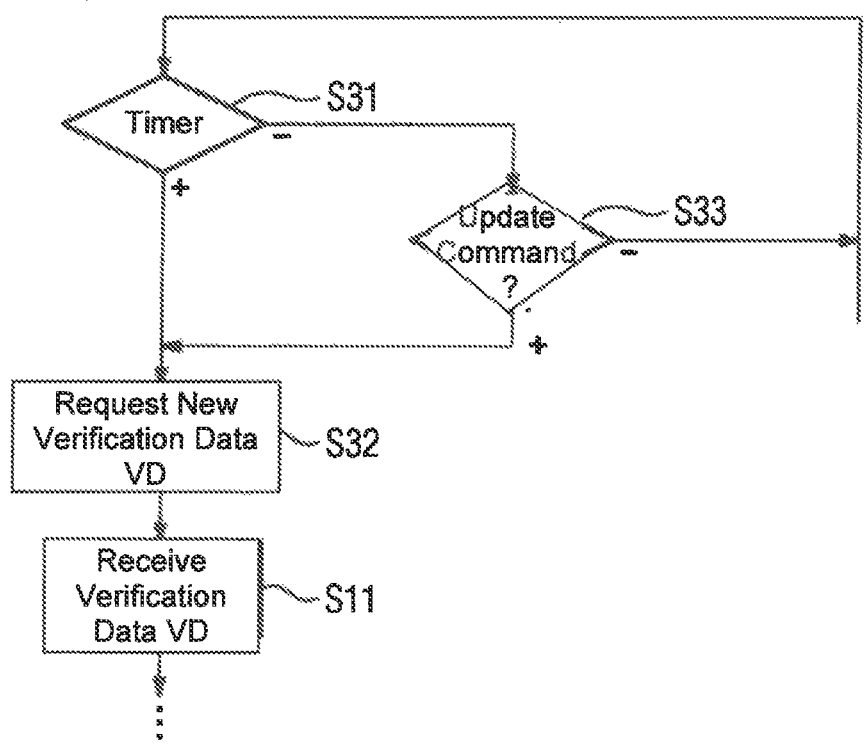

Alternatively, in a step S31, according to the representation in FIG. 5 it is possible for the control device 1 to wait for a timer 10 (see FIG. 1) to expire. If the timer 10 has expired, the control device 1 moves to a step S32. In step S32, the control device 1 requests the computer 9 to transmit new encrypted verification data VD. If the timer 10 has not yet expired, the control device 1 can move back to step S31. Alternatively or in addition to the existence of step S31, it is possible for a step S33 to exist. In step S33, the control device 1 checks whether an update command A has been predetermined thereto by an operator 11 (see FIG. 1). If this is the case, the control device 1 moves back to step S32. Otherwise, it moves back to step S31 or to step S33. In the case of the embodiment according to FIG. 5, the control device 1 is therefore the active part, which requests the transmission of the encrypted verification data VD.

Figure 6:
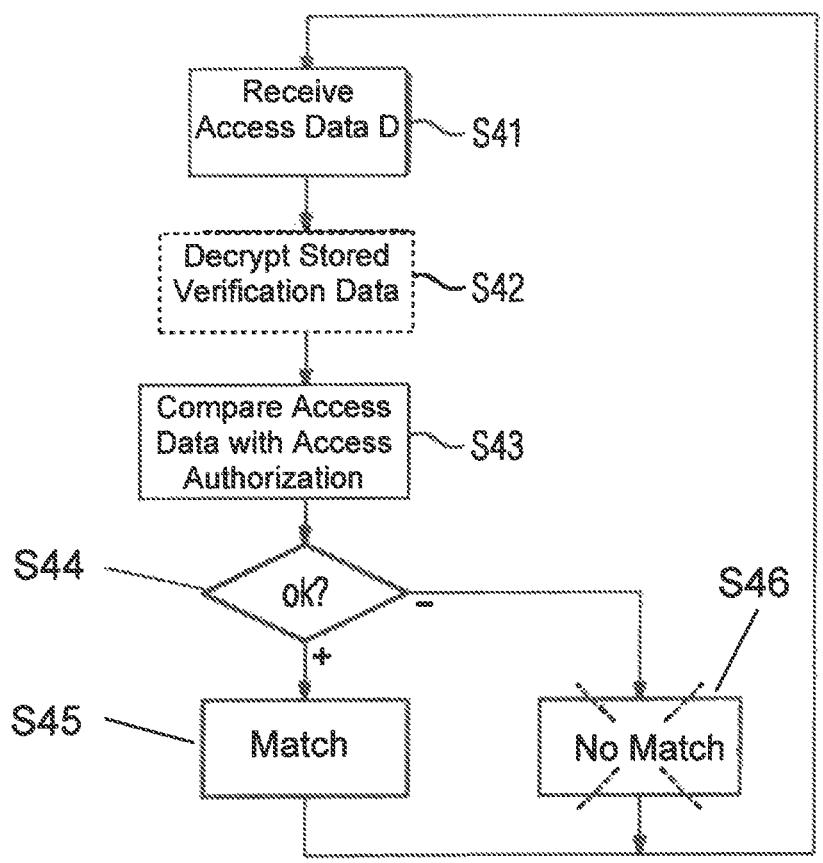

Furthermore, in a step S41 the control device 1 according to FIG. 6 receives access data D. The access data D can be specified at any point in time. The access data D can be specified to the control device 1 by the operator 11, for instance. If the step S12 (see FIG. 3) is to be dispensed with, in a step S42 the control device 1 decrypts the stored verification data VD and thus determines the decrypted verification data VD'. The step S42 is only shown with dashed lines in FIG. 6, because it only then exists if the step S12 does not exist. It corresponds to step S12 in terms of contents.

In step S43, the control device 1 compares the received access data D with a current access authorization D'. The control device 1 derives the current access authorization P' from the decrypted verification data VD'. In the simplest case, the current access authorization D' is identical to the decrypted verification data VD'. In many cases, the decrypted verification data VD' however contains the data for many people or many devices which is required to check the access authorization. In this case, in the context of step S43 the control device 1 separates the individual access authorizations D' beforehand.

In step S44, the control device 1 checks whether the comparison of step S43 produces a match. If there is a match, in a step S45 the control device 1 allows the operator 11 to access the user data ND. Otherwise, in other words if there is no match, in a step S46 the control device 1 does not allow access.

As already mentioned above, the decrypted verification data VD' is also still encrypted internally. In the context of step S44, the verification data VD' is therefore decrypted again before the actual comparison. This verification data VD' is only then decrypted (completely) by the control device 1 if it is currently required. Alternatively, it is possible for the control device 1, in the context of step S41, to encrypt the predetermined access data D and in the context of step S44 to perform the comparison of access data D and access authorization D' on this basis. By way of example, what are known as hash values can be compared with one another.

As already mentioned, the encryption (in other words the determination of the encrypted verification data VD) is preferably carried out by means of a first key (public key) and the decryption (in other words the determination of the unencrypted verification data VD') is carried out by means of a second key (private key) which differs from the first key. To ensure that the computer 9 can determine the encrypted verification data VD, the first key (public key) must be known to the computer 9. It is possible for the first key and the second key to already be known to the manufacturer of the control device 1 with the manufacture of the control device 1. In this case, the manufacturer can store the second key in the control device 1, while he stores the first key internally. A publication of the first key is possible but not absolutely necessary. Alternatively, it is possible to store both keys in the control device 1. In this case, it is possible according to the representation in FIG. 7 for the control device 1 also to carry out a step S51, in which the control device 1 provides the first key for retrieval via the computer network 8. Alternatively or in addition, the control device 1 can provide the first key for retrieval via an interface 12 arranged on the control device 1.

Figure 7:
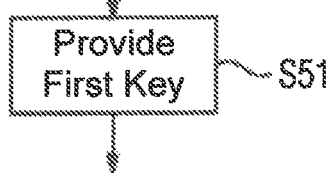

In the case of providing the first key via the computer network 8, it is possible for the control device 1 to execute the procedure in FIG. 7 in parallel or virtually in parallel with the procedures in FIGS. 2 to 6 in the background. In this case, the control device 1 carries out the procedure in FIG. 7 independently of whether or not the procedures in FIGS. 2 to 6 are carried out. Alternatively, it is possible for the control device 1 to transmit the first key to the computer 9 in response to a specific query from the computer 9. In the case of providing the first key via the interface 12 arranged on the control device 1, the transmission is generally carried out in response to a specific query from the operator 11.

Figure 4:
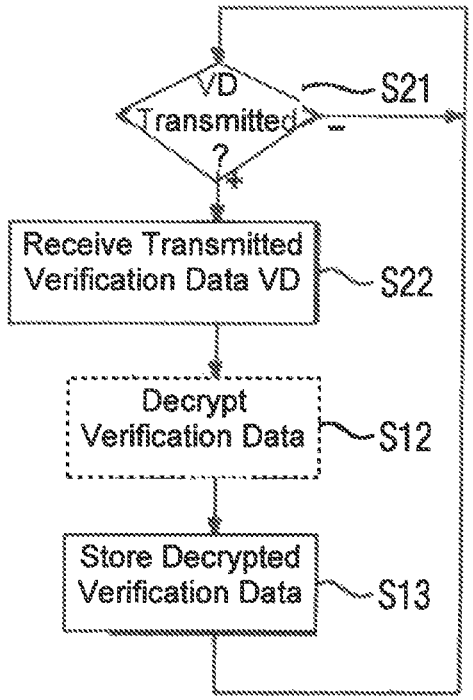

The control device 1 furthermore generally carries out either the procedure in FIG. 3 and the associated embodiments according to FIGS. 4 and 5 likewise in the background, in other words Independently of whether or not the procedures in FIGS. 2 and 6 are carried out. By contrast, the procedures in FIGS. 2 and 6 are generally mutually exclusive. It is therefore readily possible that neither the procedure in FIG. 2 nor the procedure in FIG. 6 is carried out at a specific point in time. Similarly, it is possible that either the procedure in FIG. 2 or the procedure in FIG. 6 is earned out at a specific point in time. By contrast, it is generally not permissible for both the procedure in FIG. 2 and also the procedure in FIG. 6 to be carried out at a specific point in time. In exceptional cases, this may however also be possible.

The procedure in FIG. 3—this also applies to the embodiments according to FIGS. 4 and 5—is furthermore modified in accordance with the invention as explained below in conjunction with FIG. 8. Furthermore, the procedure according to FIG. 6 is modified in accordance with the invention as explained below in conjunction with FIG. 9.

As already mentioned, the procedure in FIG. 3 is occasionally carried out again. If the control device 1 receives verification data VD at a specific point in time, at this point in time other verification data VD' is already stored in the control device 1. The aim and purpose of the procedure in FIG. 8 is to obtain this already stored verification data VD' for a (1) iteration, in other words until the next point in time at which new verification data VD is received again. In addition to the steps in FIG. 3, FIG. 8 therefore comprises a step S61. In step S61, the control device 1 retains that verification data VD' which is already stored as current verification data VD' at the point in time of receiving the verification data VD in the control device 1. It marks this verification data VD' as old verification data VD", however. In order to implement the step S61, a restorage of the initially still current verification data VD' from a basic memory 13 into an additional memory 14 can take place, for instance. It is only then that the control device 1 stores the decrypted verification data VD' determined from the newly received verification data VD in the basic memory 13. Previously obtained data is overwritten in the additional memory 14.

Two items of verification data VD', VD" (precisely) are therefore available to the control device 1, namely on the one hand the current verification data VD' and on the other hand the old verification data VD", at any point in time until the next update of the verification data VD'. A step S71 in which the control device 1 compares the received access data D with an old access authorization D" therefore exists according to the representation in FIG. 9 in addition to the steps of FIG. 6. If necessary, the step S71 can also contain the decryption of the old verification data VD". Furthermore, in a step S72 the control device 1 checks whether the comparison of step S71 produces a match. If there is a match, the control device 1 moves to step S45. Otherwise, the control device 1 moves to step S46.

The steps S71 and S72 therefore correspond in terms of content to the steps 343 (possibly including the step S42) and S44, albeit on the basis of the comparison of the access data D with an old access authorization D" derived from the old verification data VD".

The advantages of the procedure in FIGS. 8 and 9 are apparent in particular if a fault occurs in the control device 1 at precisely the point in time at which an update of the verification data VD' takes place. This is because, as a result, a valid set of verification data, namely the old verification data VD", is then also available to the control device 1.

In summary, the present invention therefore relates to the following facts:

A control device 1 of a machine or system 2 receives access data D at any points in time and compares it with a current access authorization D'. If there is a match, the control device 1 allows access to user data ND stored within the control device 1. The control device 1 generates and/or considers the user data ND in the context of controlling the machine or system 2. The control device 1 occasionally receives encrypted verification data VD from a computer 9 via a link 8 to a computer network 8 and stores the received verification data VD in the control device 1 in encrypted or unencrypted form as current verification data VD'. It derives the current access authorization D' from the unencrypted current verification data VD'. Verification data VD which is already stored in the control device 1 as current verification data VD' when the verification data VD is received is retained by the control device 1 as old verification data VD". Data stored previously as old verification data VD" is overwritten. The control device 1 also compares the received access data D with an old access authorization D" derived from the old verification data VD". It allows the operator 11 to access the user data ND even if there is a match with the old access authorization D". Otherwise, it does not allow access to the user data ND.

The present invention has many advantages. In particular, the security-related problems of the prior art are comprehensively rectified.

Although the invention has been illustrated and described in more detail by the preferred exemplary embodiment, the invention is therefore not restricted by the disclosed examples and other variations can be derived herefrom by the person skilled in the art without departing from the scope of protection of the invention.

The invention claimed is:

1. A method for operating a control device of a machine or system, said method comprising:
    comparing access data received by the control device with a current access authorization stored in the control device;
    allowing access to user data stored in the control device when the received access data match the current access authorization;
    from time to time receiving encrypted verification data from a computer linked to a computer network and storing the received encrypted verification data in the control device in encrypted or in unencrypted form as current verification data;
    deriving the current access authorization from the unencrypted current verification data;
    retaining as old verification data verification data which are already stored in the control device as current verification data when the encrypted verification data were received from the computer;
    comparing the received access data with a previously received access authorization derived from the old verification data;
    allowing an operator to access the user data also when the received access data match the previously received access authorization;
    prohibiting access to the user data stored in the control device when the received access data match neither the current access authorization nor the previously received access authorization; and
    controlling the machine or system with the user data.

2. The method of claim 1, further comprising:
    decrypting the received verification data with a secret key before or after storing the received verification data, and
    providing, for retrieval via the computer network or via an interface arranged on the control device, for encrypting the received verification data a public key which differs from the secret key.

3. The method of claim 1, further comprising:
    defining the encrypted verification data by the computer at periodic time intervals, or
    retrieving the encrypted verification data based on a course of time monitored by the control device, or based on an update command entered by the operator.

4. The method of claim 1, wherein the control device is embodied as a CNC (computer numeric control), MC (motion control), PLC (programmable logic control) or as a drive controller.

5. A computer program product embodied in a computer-readable non-transitory storage medium and comprising, machine code which, when loaded in a memory of a control device for a system or machine and processed by the control device, causes the control device to
- receive access data,
- compare the received access data with a current access authorization stored in the control device,
- allow access to user data stored in the control device when the received access data match the current access authorization,
- from time to time receive encrypted verification data from a computer linked to a computer network and store the received encrypted verification data in the control device in encrypted or in unencrypted form as current verification data,
- derive the current access authorization from the unencrypted current verification data,
- retain as old verification data verification data which are already stored in the control device as current verification data when the encrypted verification data were received from the computer,
- compare the received access data with a previously received access authorization derived from the old verification data,
- allow an operator to access the user data also when the received access data match the previously received access authorization,
- prohibit access to the user data stored in the control device when the received access data match neither the current access authorization nor the previously received access authorization, and
- control the machine or system with the user data.

6. A control device for a system or machine, said control device comprising:
- a link to a computer network configured to connect the control device to a computer, and
- a computer program, which comprises machine code embodied in a computer-readable non-transitory storage medium, wherein the computer program, when loaded in a memory of the control device and processed by the control device, causes the control device to
- receive access data,
- compare the received access data with a current access authorization stored in the control device,
- allow access to user data stored in the control device when the received access data match the current access authorization,
- from time to time receive encrypted verification data from a computer linked to a computer network and store the received encrypted verification data in the control device in encrypted or in unencrypted form as current verification data,
- derive the current access authorization from the unencrypted current verification data,
- retain as old verification data verification data which are already stored in the control device as current verification data when the encrypted verification data were received from the computer,
- compare the received access data with a previously received access authorization derived from the old verification data,
- allow an operator to access the user data also when the received access data match the previously received access authorization,
- prohibit access to the user data stored in the control device when the received access data match neither the current access authorization nor the previously received access authorization, and
- control the machine or system with the user data.

* * * * *